US009582826B2

(12) United States Patent
Calman et al.

(10) Patent No.: US 9,582,826 B2
(45) Date of Patent: Feb. 28, 2017

(54) DIRECTIONAL WAYFINDING

(75) Inventors: Matthew A. Calman, Charlotte, NC (US); Susan Smith Thomas, Gastonia, NC (US); Erik Stephen Ross, Charlotte, NC (US); Jooyong Lee, Silver Spring, MD (US); Zhenshuo Fang, San Francisco, CA (US); James Mulholland, San Francisco, CA (US); Brendan Kiu, Sunnyvale, CA (US); Nastasha Tan, Torrance, CA (US)

(73) Assignee: Bank of America Corporation, Charlotte, NC (US)

( * ) Notice: Subject to any disclaimer, the term of this patent is extended or adjusted under 35 U.S.C. 154(b) by 583 days.

(21) Appl. No.: 13/355,932

(22) Filed: Jan. 23, 2012

(65) Prior Publication Data

US 2013/0191246 A1    Jul. 25, 2013

(51) Int. Cl.
*G06Q 30/00* (2012.01)
*G06Q 30/06* (2012.01)

(52) U.S. Cl.
CPC ................. *G06Q 30/0639* (2013.01)

(58) Field of Classification Search
CPC ................................................ G06Q 30/0639
USPC .............................................. 705/26.1–27.2
See application file for complete search history.

(56) References Cited

U.S. PATENT DOCUMENTS

| 6,442,530 | B1 * | 8/2002 | Miller | 705/16 |
|---|---|---|---|---|
| 6,574,549 | B2 * | 6/2003 | Cato et al. | 701/533 |
| 7,689,473 | B2 * | 3/2010 | Borom et al. | 705/26.1 |
| 7,739,157 | B2 * | 6/2010 | Bonner et al. | 705/26.9 |
| 8,412,590 | B2 * | 4/2013 | Elliott | 705/26.9 |
| 8,775,260 | B1 * | 7/2014 | Pienkos | 705/22 |
| 2002/0038264 | A1 * | 3/2002 | Ishikawa | 705/27 |
| 2004/0093274 | A1 * | 5/2004 | Vanska | G01C 21/20 705/26.7 |
| 2005/0165649 | A1 * | 7/2005 | Mahaffey et al. | 705/26 |
| 2006/0010046 | A1 * | 1/2006 | Van Zandt | 705/26 |
| 2006/0190340 | A1 * | 8/2006 | Myskowski | 705/26 |
| 2007/0055563 | A1 * | 3/2007 | Godsey | G06Q 20/202 705/14.37 |
| 2008/0126210 | A1 * | 5/2008 | Shanahan | 705/14 |
| 2008/0237339 | A1 * | 10/2008 | Stawar | B62B 3/1408 235/383 |

(Continued)

OTHER PUBLICATIONS

Gallagher, J. 2011, "Technologies Should Make Shopping More Efficient", Supermarket News, vol. 59, No. 28, pp. NA.*

*Primary Examiner* — Alexis Casey
*Assistant Examiner* — Brittany Bargeon
(74) *Attorney, Agent, or Firm* — Michael A. Springs; Moore & Van Allen PLLC; Peter B. Stewart

(57) ABSTRACT

Embodiments of the invention include systems, methods, and computer-program products that provide for a unique directional wayfinding system. In one embodiment of the invention, products are received from the user, such as a shopping list or wish list. The system determines the location of the user, determines the location of the product in the business, determines a route from the user to the product, and provides instructions to the user along the route. In an embodiment, the system identifies and/or confirms the product when the user reaches the product. In at least one embodiment, the systems, methods, and computer-program products provide functionality for the visually-impaired to assist in everyday shopping for products in businesses.

17 Claims, 7 Drawing Sheets

(56) References Cited

U.S. PATENT DOCUMENTS

| | | | |
|---|---|---|---|
| 2009/0012704 A1* | 1/2009 | Franco | G01C 21/20 701/532 |
| 2009/0112683 A1* | 4/2009 | Hamilton, II | G06Q 30/02 705/7.32 |
| 2009/0182499 A1* | 7/2009 | Bravo | 701/207 |
| 2010/0027527 A1* | 2/2010 | Higgins | H04W 4/18 370/351 |
| 2010/0106591 A1* | 4/2010 | Fuzell-Casey | G06Q 30/02 705/14.25 |
| 2010/0299188 A1* | 11/2010 | Karnalkar | G06Q 30/0207 705/14.1 |
| 2011/0122125 A1* | 5/2011 | Yoon | G06F 17/30713 345/419 |
| 2011/0173041 A1* | 7/2011 | Breitenbach et al. | 705/7.13 |
| 2011/0191207 A1* | 8/2011 | Schueller et al. | 705/26.9 |
| 2011/0196724 A1* | 8/2011 | Fenton | G06Q 20/108 705/14.16 |
| 2011/0251920 A1* | 10/2011 | Watson | 705/26.9 |
| 2011/0283329 A1* | 11/2011 | Davis et al. | 725/62 |
| 2012/0075433 A1* | 3/2012 | Tatzgern et al. | 348/50 |
| 2012/0089470 A1* | 4/2012 | Barnes, Jr. | 705/16 |
| 2012/0259732 A1* | 10/2012 | Sasankan et al. | 705/26.9 |
| 2012/0316989 A1* | 12/2012 | Wong et al. | 705/26.9 |

* cited by examiner

DIRECTIONAL WAYFINDING

BACKGROUND

Currently, customers may have a difficult time finding products in stores. Often, stores move the products around, which make locating specific products difficult. Also, stores are not standardized with respect to the location of products, so knowing the location of the product in one store does not mean that the customer will be able to find the product in another store. Customers may become frustrated with the inability to locate products in a store and leave without purchasing anything.

To further complicate the issue of finding products in stores, stores often run out of stock of certain products so even if a customer knows where the product should be located, it may not be there when the customer arrives. The lack of current information on product location results in wasted trips, frustrated customers, and lost sales when customers go to another store for their shopping.

Additionally, visually-impaired customers may have difficulty navigating through a store to locate products. Stores may have unusual layouts, products are difficult to locate and identify, and even if the customer knows where the product is supposed to be located, the product may not be in stock when the customer gets to the location. Visually-impaired individuals desire the freedom to shop in stores independently but find it difficult without guidance to products.

Financial institutions look to serve customers by making their lives easier. One way financial institutions can do this is by assisting customers in locating products within stores. Financial institutions also desire to serve business customers, for example, by providing tailored marketing strategies so that businesses are effectively using marketing resources and customers are receiving useful information in a convenient manner.

BRIEF SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Some embodiments of the present invention provide a computer-implemented method for directing a user to a product in a facility. The computer-implemented method involves receiving at least one product, wherein the product is available in a facility. In some embodiments, the computer-implemented method determines the location of the user and/or the product. For example, the computer-implemented method can determine the location of the user by triangulation with a mobile device, proximity to pre-set markers, determining the initial location and tracking of movement, or video scanning. The computer-implemented method can determine the location of products by receiving planogram data from the business and/or by receiving crowdsourced data from individuals or social media sites. In an embodiment, the method also determines the route after receiving a facility map from facility, wherein the facility map provides the layout of the store including the paths, objects, and areas of interest. In some embodiments, the computer-implemented method determines a route from the user to the product, such as the shortest route, the least congested route, the easiest route, or a route that also allows the user to receive targeted offers. Once the route is determined, the computer-implemented method provides instructions for the user along the route. For example, the user may receive audible (e.g., stereo) instructions or visual (e.g., written) instructions. In still further embodiments, the computer-implemented method assists the user in identifying and/or confirming products along the route. For example, the user may scan a product with a scanning device and use object identification software to identify the product. Certain embodiments will feature the additional steps of determining an offer to provide the user. The computer-implemented method may determine the offer based on the route determined for the user or the products selected by the user.

Embodiments of the present invention provide a system for directing a user to a product in a facility. In an embodiment of the invention, the system includes a computing platform including a processor and a memory. The system also includes a user location routine stored in the memory and executable by the processor. The user location routine is configured to determine the location of the user. The system further includes a product location routine stored in the memory and configured to determine the location of a product. For example, the user may provide a shopping list or a wish list. The system further includes a route determination routine stored in the memory and executable by the processor. The route determination routine is configured to determine a route that would lead the user to the product. Further, the system includes a presentation routine stored in the memory and executable by the processor. The presentation routine is configured to present the route to the user. Additionally, the system may include a mobile device configured to communicate the route from the processor to the user. The mobile device may communicate the route from the processor to the user through output devices, such as stereo headphones or digital screens. The system may also include a positioning system device, such as a transceiver, an accelerometer, a magnetometer, a compass, an altimeter, etc., that is configured to determine the location of the mobile device in the facility.

Embodiments of the present invention further provide a computer program product comprising a non-transitory computer readable medium having computer executable program code embodied therein for directing a user to a product in a facility. In one embodiment, the computer-readable medium includes: a first set of codes for causing a computer to determine a location of a user; a second set of codes for causing the computer to determine a location of a product; a third set of codes for causing the computer to determine a route that would lead the user to the product; and a fourth set of codes for causing the computer to present the route to the user.

Other aspects and features, as recited by the claims, will become apparent to those skilled in the art upon review of the following non-limited detailed description of the invention in conjunction with the accompanying figures.

BRIEF DESCRIPTION OF THE DRAWINGS

Figure 1:
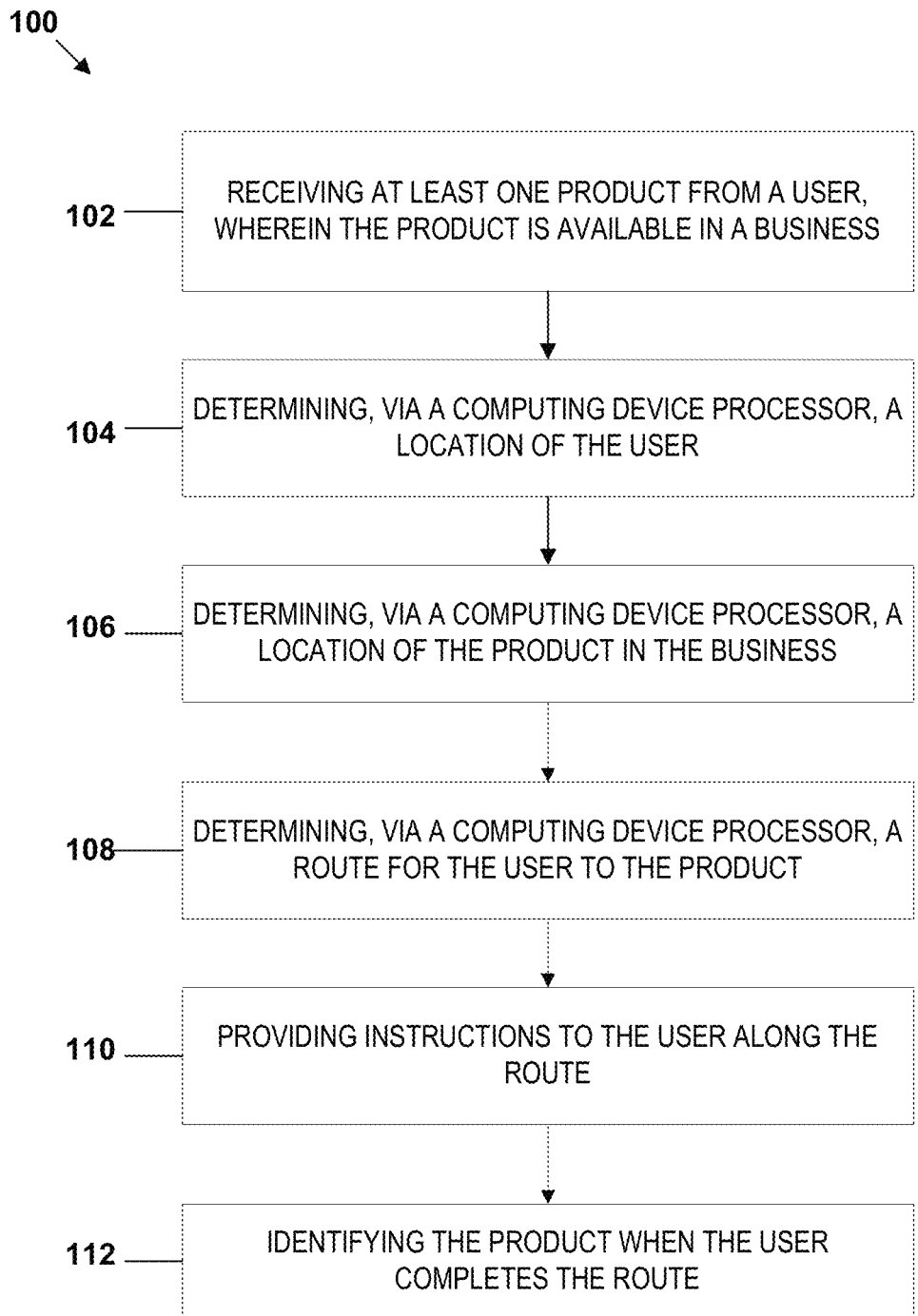
Figure 2:
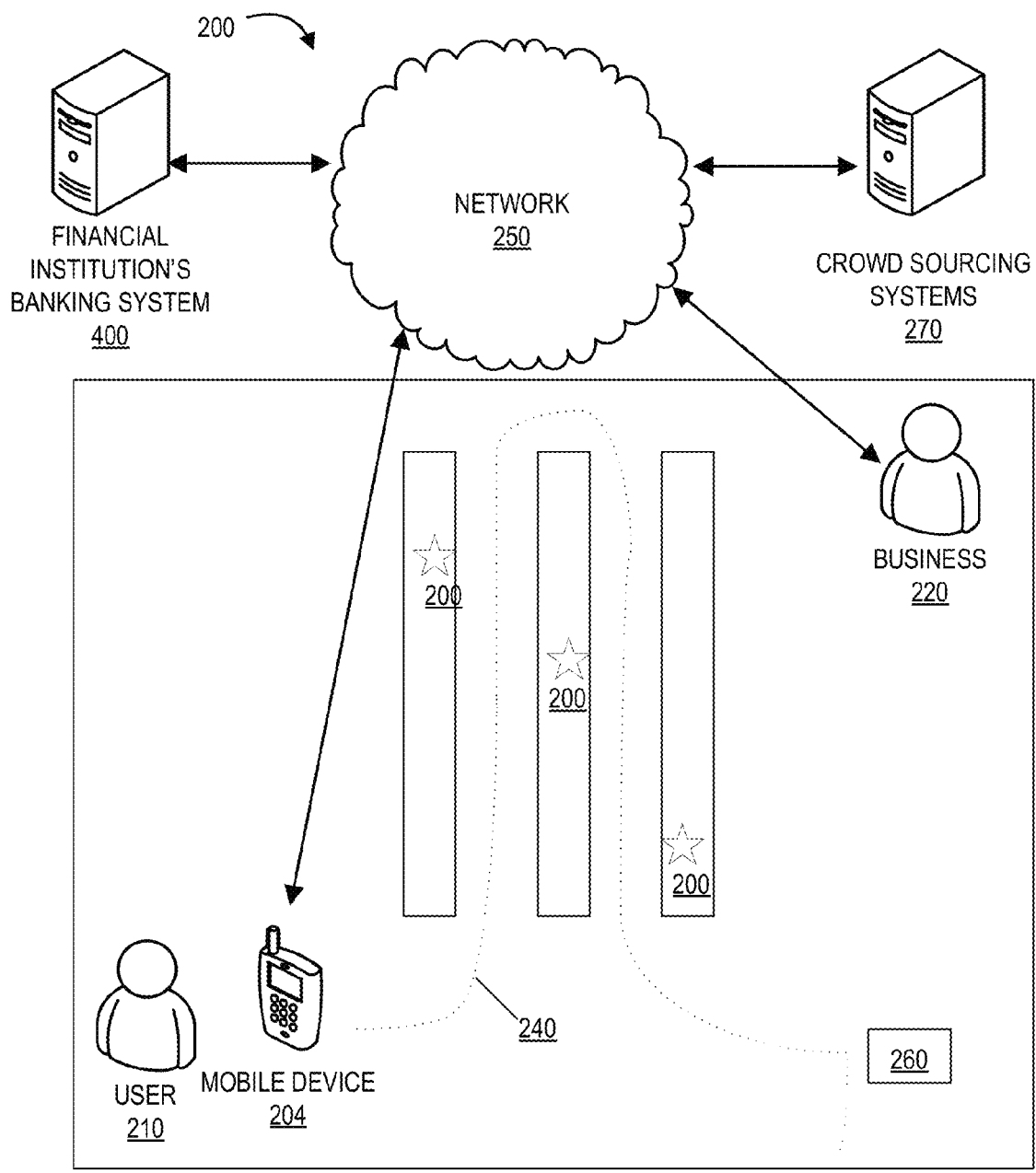
Figure 3:
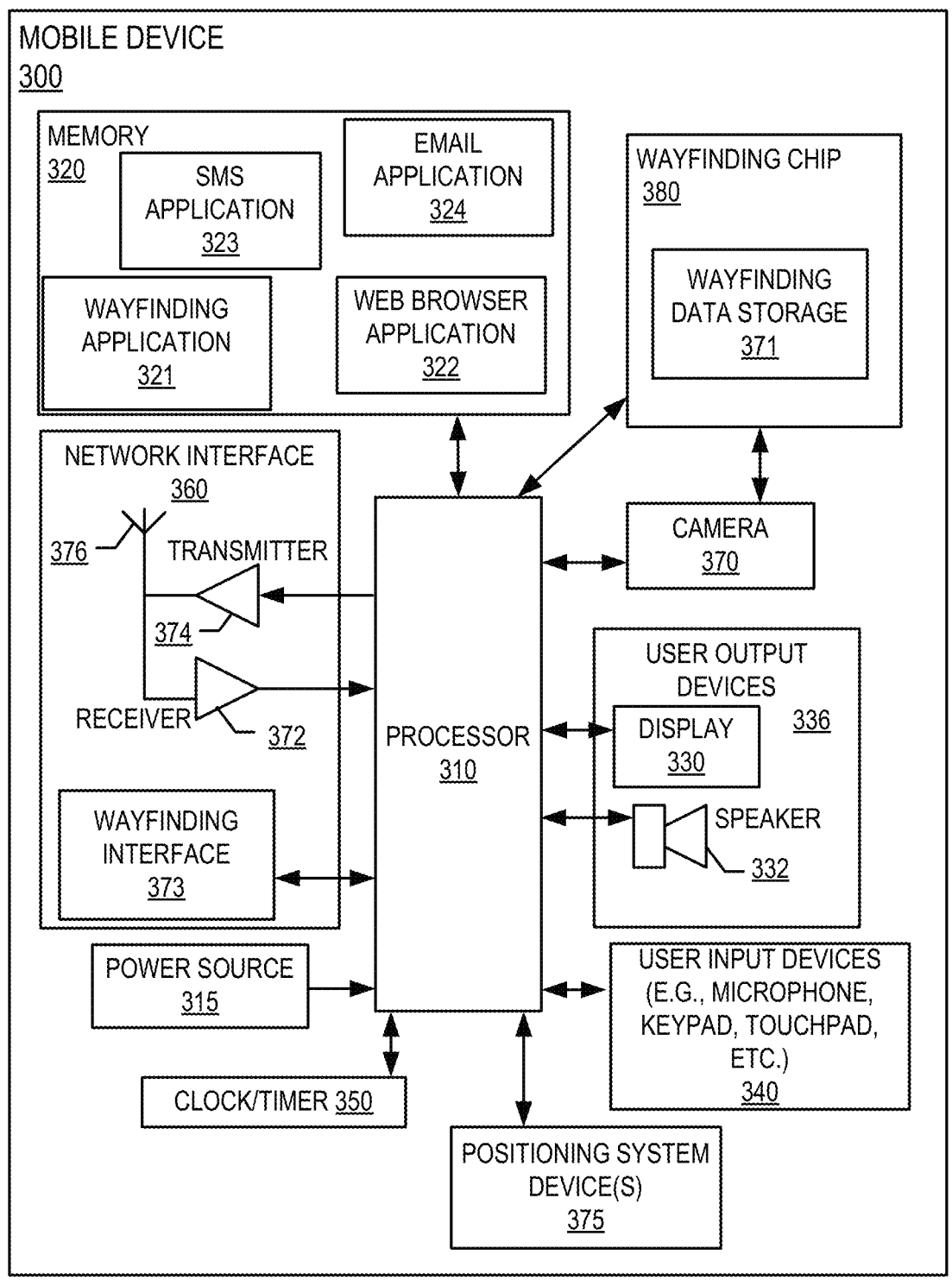
Figure 4:
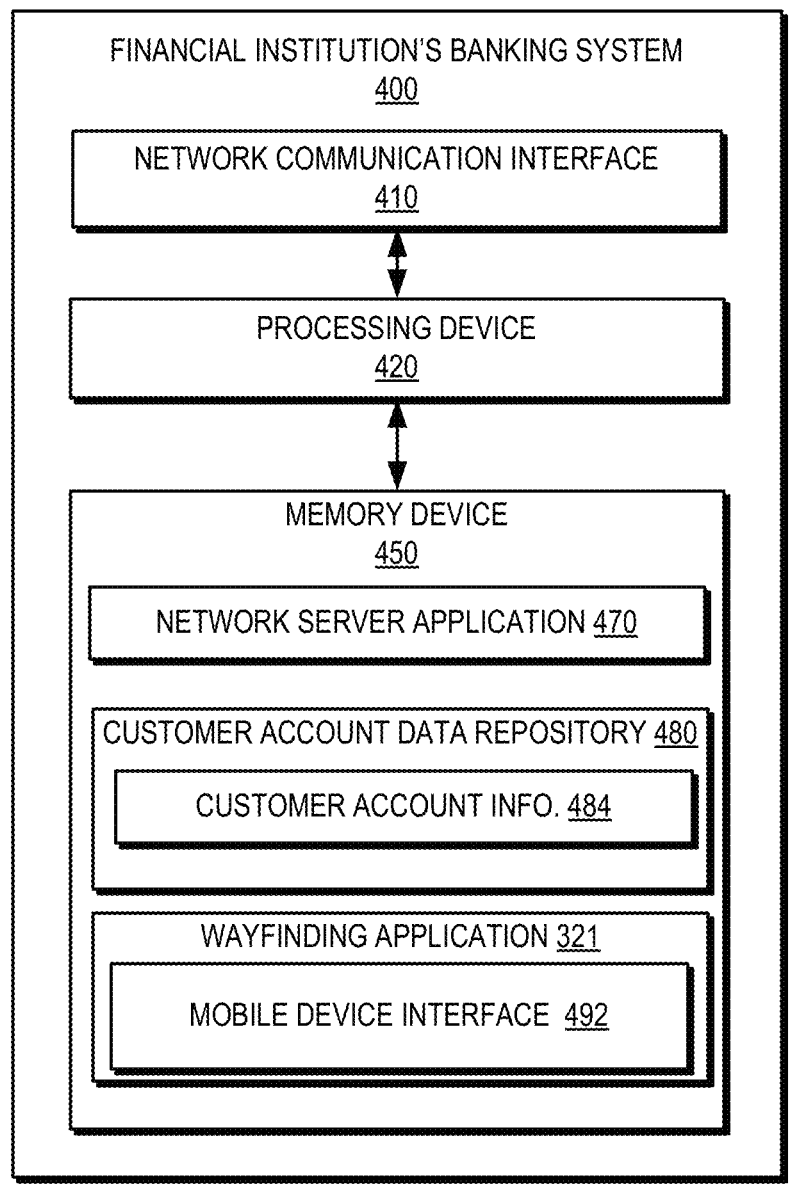
Figure 5A:
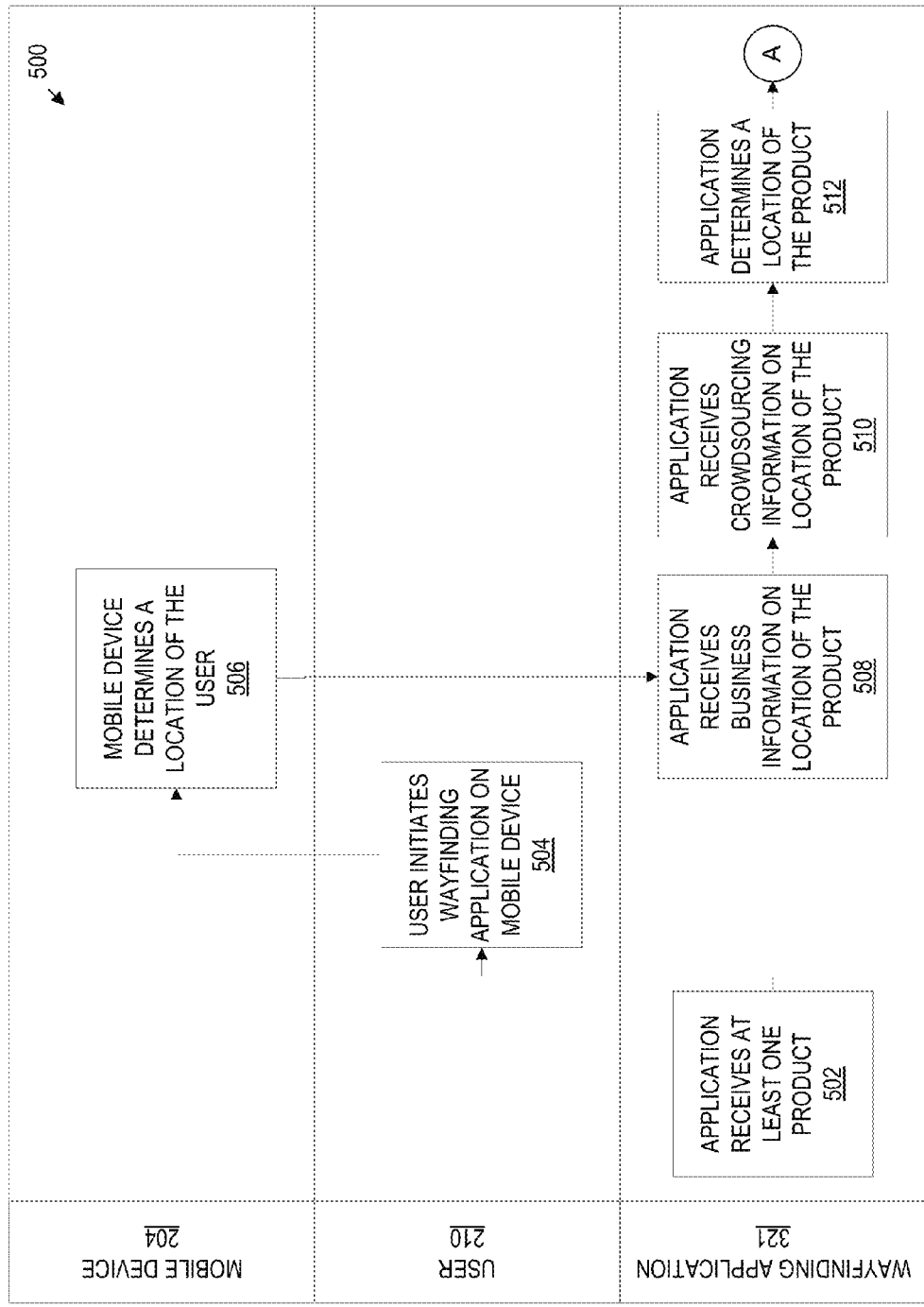
Figure 5B:
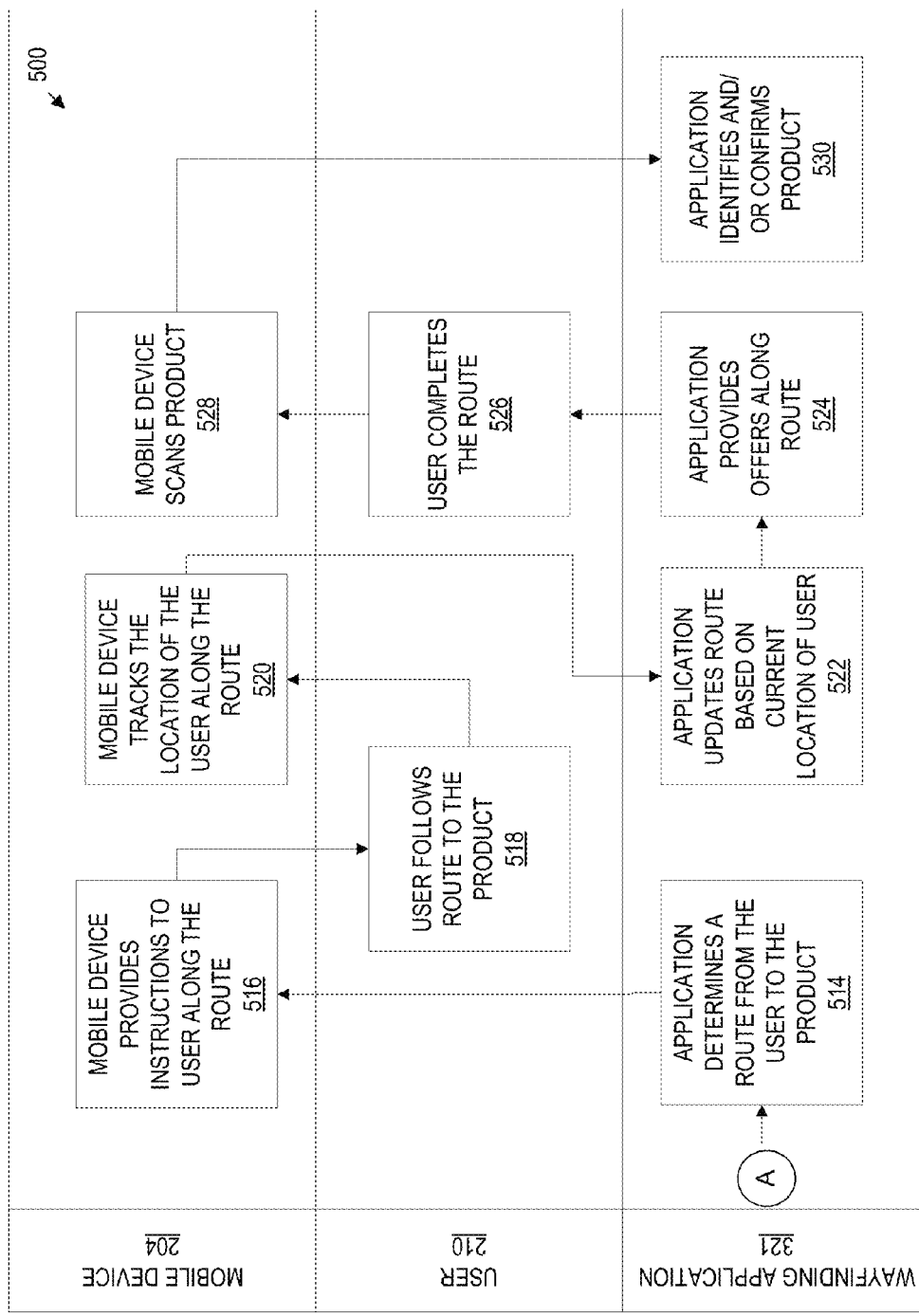
Figure 6:
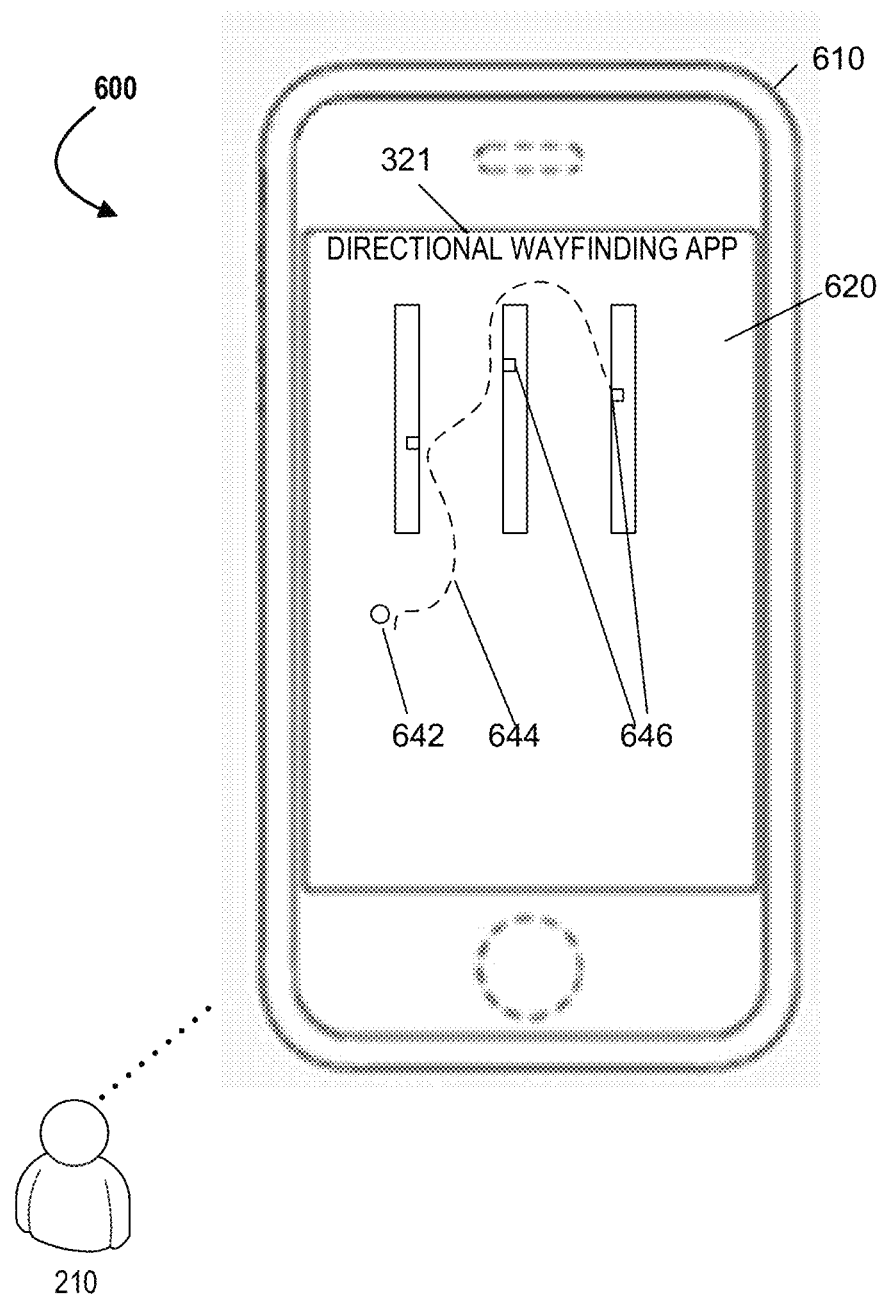

Having thus described embodiments of the invention in general terms, reference will now be made to the accompanying drawings, wherein:

FIG. 1 is a flow chart of a method for providing directional wayfinding to a product in a facility, in accordance with some embodiments of the invention;

FIG. 2 is a depiction of an environment in which a user is orienting to a product using a method of directional wayfinding, in accordance with some embodiments of the invention;

FIG. 3 is a block diagram illustrating a mobile device, in accordance with an embodiment of the invention;

FIG. 4 is a block diagram of a financial institution's banking system, in accordance with some embodiments of the invention;

FIGS. 5a and 5b are flow charts of a computer-implemented method for providing directional wayfinding to a product in a facility, in accordance with some embodiments of the invention; and FIG. 6 is an example of a mobile device providing directional wayfinding, in accordance with some embodiments of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Computer-implemented methods, systems, apparatuses, and computer program products are described herein for directing users to a product in a facility. After receiving a least one product, wherein the product is available in a facility, the computer-implemented method and system determines the location of the user and the product, determines a route that would lead the user to the product, and provides instructions to the user along the route. In some embodiments, the computer-implemented method and system further identifies the product when the user completes the route. The system and method assist users in locating products, such as products on a shopping list or wish list, in a facility. Various approaches can be used to identify the location of the user and/or the product. For example, GPS, Wi-Fi triangulation, NFC or RFID detection at pre-set locations/markers, distance measures from pre-set markers, accelerometers, magnetometers, or video tracking can be used to identify the location of the users. Products can be located based on planograms received from businesses or vendors, through crowdsourcing data, or by labeling the products with markers. In some embodiments, a map of the facility is also evaluated to determine the route. Once the locations of the user and the product are determined, the system and method determines the route that would lead the user to the product by one of many different methods. For example, the shortest distance from the user to the product can be calculated based the facility map. If more then one product is provided to the system and method, the route can determine the shortest distance to reach each of the products. If some of the products are refrigerated, the route can be determined so that the refrigerated items are picked up near the end of the route rather than at the beginning of the route. Ease of transportation through the business can also be used to determine the route, such as sending the user down wide, straight aisles rather than narrow or crooked aisles. Determination of the location of users, determination of the location of products, determining a route that would lead the user to the product, and providing instructions to the user along the route using the computer-implemented method are discussed in more depth below with regard to FIGS. 1-6.

As illustrated, aspects of the present disclosure include computer-implemented methods, systems, and computer program products for providing directional wayfinding to a product in a facility. It will be appreciated that, although embodiments of the present invention are generally described in the context of locating products in for-profit businesses, other embodiments of the invention provide wayfinding functionality for other types of facilities, such as warehouses, non-profit organizations, and public spaces. For example, stadiums for sporting events may be configured to support a method of directing individuals to exits, restrooms, seats, and food stands.

FIG. 1 illustrates a general process flow of a computer-implemented method 100 for directing individuals to a product in a business, in accordance with an embodiment of the invention. In block 102, the computer-implemented method 100 receives at least one product, wherein the product is available in the facility. A product can be a unique product (e.g., a painting in an art gallery, etc.), a specific type or brand name of product (e.g., a specific type of breakfast cereal, etc.), a general name of a product (e.g., black beans, etc.), or a general category for a product (e.g., baked goods, etc.). The user may enter a shopping list or wish list into an application on the mobile device. Alternatively, the user may email a list to an address that automatically enters the list into the system. In some embodiments, the user also discloses the facility in which the products are located, although this is not necessary. In still further embodiments, the financial institution provides the at least one product to the system, or augments the user's list with additional suggestions. In yet still further embodiments, a maximum price or distance for the product is also provided to the system and method. The at least one product is the product that the user will be directed to through the directional wayfinding application.

In block 104, the computer-implemented method 100 determines, using a computing device processor, a location of the user. In some embodiments, the computer-implemented method 100 determines the location of the user by triangulation of wireless signals in the facility, such as GPS or Wi-Fi. In another embodiment, the location of the user is determined based on distance from pre-set markers. In a still further embodiment, the location of the user is determined based on the initial location of the user. For example, a GPS may determine that the user is entering a business at a specific location. As the user enters the business, the GPS signal may be lost but an accelerometer associated with the mobile device may determine the user's direction and speed so that the user's current location can be calculated based on the user's initial location. A compass may be used with the accelerometer. In another example, the user swipes a sensor, such as an RFID or NFC tag, when entering the business to provide the user's initial location to the computer-implemented method. Similarly, a sensor may be built into an opening so that the user is identified as the user enters the business. For example, an opening may be configured with a detector that senses the passage of individuals and identifies users of the method based on communication with the users' mobile devices. In some embodiments, the mobile device determines the user's location. Additionally or alternatively, the business may determine the user's location. For example, the business may include video cameras that track an individual's location and provide that information to the mobile device or the server coordinating with the mobile device. Further, the user may input the user's location. The user's location could also be determined based on accelerometers, gyroscopes, earth magnetic field sensors, air-pressure sensors (altitude), etc.

In block 106, the computer-implemented method 100 determines a location of the product in the facility. In one embodiment, the method receives the location from the facility itself. For example, the facility may provide a planogram of the products within the facility. The planogram may be provided for the initial set-up of the facility or may be updated with the most recent set-up. Facilities may change the location of products frequently, however, so the planogram may not be up-to-date. In some embodiments, the planogram is augmented or replaced by crowdsourcing data. Crowdsourcing data are data provided by users and/or the general public. In some instances, individuals shopping within businesses can tag or update the location of products. As will be discussed in greater detail later, individuals can be provided with incentives to tag or update the location of products. In a still further embodiment, products are tagged and provide the location the method. For example, the business and/or the manufacturing may tag products with a label, such as an RFID label, that can be located by the method. As discussed, the method may also receive a facility map along with the planogram, where the facility map provides the layout of paths and objects in the facility. In another embodiment, the facility layout is determined based on tracking of individuals passing through the facility. For example, the method may track individuals and determine the facility layout based on the individuals' passage through the facility.

In some embodiments, a route that would lead the user to the product is determined as shown in block 108. In an embodiment, the computer-implemented method determines the route based on the shortest distance from the user's current location to the product. In a further embodiment, the computer-implemented method determines the route based on the shortest travel time, considering that some routes take longer than other routes. For example, wide, straight aisles are faster and/or easier to traverse than narrow and/or winding paths. In some embodiments, the computer-implemented method and/or the business evaluates the length of time that the user or other individuals have taken on the route previously and estimates the length of time that the user will currently spend on the route. In a further embodiment, the route can be determined at least in part on offers that will be presented to the user. In some embodiments, a cash register, a rest room, an emergency exit, or other facility-oriented locations can be added to the route.

Turning now to block 110, the computer-implemented method 100 provides instructions to the user along the route. In some embodiments, the computer-implemented method 100 provides audible instructions to the user; in other embodiments, the computer-implemented method 100 provides visual instructions to the user. In still further embodiments, the computer-implemented method 100 provides a combination of audible and visual instructions to the user. In an exemplary embodiment, the method provides audible instructions by using natural language. For example, the method may instruct the user to walk twenty steps forward and then turn right. In another embodiment, the method includes providing directional tones in stereo headphones that are capable of orienting and directing the user in 360 degrees. In some embodiments, written instructions are provided to the user or a map of the business is presented on a screen associated with the mobile device. Other methods of providing instructions to the user along the route are also possible, such as using vibrations, a compass heading on the mobile device, or audible beeping when the mobile device is pointed in the proper direction.

In addition, in some embodiments, the computer-implemented method provides an offer to the user. The offer may be for products that are along the route the user will take or the offer may be for products that are related to the products on the list, such as part of a recipe. In a still further embodiment, the offer provided to the user may be one that the system determined to be likely used by the user. This is based on the transactional data, biographical data, social network data, publicly available information, and the like, of the user. In one embodiment, the computer-implemented method provides an offer associated with the business or organization that the user is visiting. For example, if the user is shopping in a grocery store, and the user's financial transaction history indicates a history of shopping at farmers markets, a coupon for a type of vegetable may be provided to the user. In one embodiment of the invention, the offer is an advertisement. For example, the offer may be an advertisement for a product or service in the business. In other embodiments, the offer may include a coupon, a solicitation, or a request for volunteer service, etc. The offer may be customized for the user with data from the user's financial accounts. The offer may be in visual (e.g., a written advertisement or a picture, etc.) or audible (e.g., a recording, a jingle, etc.) format.

In block 112, once the computer-implemented method 100 directs the user to the product, the computer-implemented method 100 may identify the product. For example, the method may scan a product held by the user and, using object identification logic, determine the identity of the product. An application can take an image of a can and determine the brand and contents of the can. The application can then audibly report the brand and contents to the user or can confirm that the desired product is held.

As will be discussed, the computer-implemented method 100 may have a variety of supplemental steps and accomplish the steps in a variety of ways. Further, the steps do not need to be performed in the order discussed herein. The examples disclosed herein are not intended to be limiting to the various ways in which the mobile device can determine its location, or the ways the user may be directed to the product.

Referring to FIG. 2, a block diagram illustrating an environment 200 in which a user 210 is directed to at least one product 230 in a facility 220 in accordance with an embodiment of the invention. In one embodiment, the user 210 inputs a shopping list comprising the products 230 to the system. For example, the user may input the products to a mobile device 204, or the mobile device 204 may sync with a server, such as one hosted by the user's banking system 400 or the facility 220, and receive the shopping list comprising the products 230 from the server. When the system is activated, the system and method determines the location of the user 210, the location of the products 230, and the route 240 from the user to the products. As will be discussed, the location of the user and/or the products can be determined in many different ways. In an exemplary embodiment, the system and method connects to a crowdsourcing system 270 to receive and/or update the location of products in the facility. In an embodiment, the system and method also directs the user to other locations, such as the cash register 260, the store exit, or restrooms, etc.

In an embodiment, the facility 220 and/or mobile device 204 transmits data over a network 250. For example, the data may be transmitted over wired networks, wireless networks, the Internet, Near Field Communication (NFC) networks, Bluetooth™ networks, RFID networks, or the like. The data transmit over the network 250 to the financial institution's banking system 400, to a crowdsourcing system 270 or to one another. The mobile device 204, facility 220, banking system 400, and crowdsourcing system 270 communicate over the network 250 so that product lists, location information, user information, planograms, facility maps, and offers can be transferred between the entities in the environment. As will be discussed, the wayfinding functionality can be present in the mobile device 204, in the banking system 400, or in a combination of the mobile device 204 and the banking system 400.

In some embodiments, the financial institution's banking system 400 coordinates with the facility 220. For example, the financial institution banking system 400 may communicate with the facility 220 to receive a planogram depicting the location of the products in the facility. The banking system 400 may communicate on a regular basis with the facility 220, or may receive updates from the business when the planogram is updated. In another embodiment, the banking system 400 communicates with vendors for the facility 220 and prompts the vendors to provide information on location of products in the facility. For example, a supplier of a specific type of product may determine the location of that product in a business and can update the financial institution banking system 400 with that information. The financial institution banking system 400 may also solicit facilities, businesses, vendors, and manufacturers of products for offers that can be presented to users.

FIG. 3 illustrates an embodiment of a mobile device 300 that may be configured to execute wayfinding functionality. A "mobile device" 300 may be any mobile communication device, such as a cellular telecommunications device (i.e., a cell phone or mobile phone), personal digital assistant (PDA), smartphone, a mobile Internet accessing device, or other mobile device including, but not limited to portable digital assistants (PDAs), pagers, mobile televisions, gaming devices, laptop computers, tablet computers, cameras, video recorders, audio/video players, radios, GPS devices, and any combination of the aforementioned, or the like. In some embodiments, the mobile device 300 includes a wired or wireless connection to a communication device, such as an earpiece, stereo headset, eyewear, or other communication device, wherein the communication device is configured to relay wayfinding information to the user. In a further embodiment, the wayfinding technology is embedded in a bracelet operably linked to a communication device, such as a stereo headphone, for communicating with the user.

In a still further embodiment, the mobile device is embodied in a transportation assistance form factor, such as a cart, scooter, a wheelchair, a cane, or a walker. The transportation assistance form factor may include a connection to a communication device, such as headphone, ear buds, or speakers, or may sync with the user's mobile device, e.g., mobile phone, to provide instructions to the user. In one example, businesses provide carts or wheelchairs that are configured to provide directional wayfinding functionality to users. In a further embodiment, powered devices such as electric wheelchairs, scooters, or carts automatically drive the user along the route.

The mobile device 300 may generally include a processor 310 communicably coupled to such components as a memory 320, user output devices 336, user input devices 340, a network interface 360, a power source 315, a clock or other timer 350, a camera 370, at least one positioning system device 375, one or more wayfinding chips 380, etc. The processor 310, and other processors described herein, may generally include circuitry for implementing communication and/or logic functions of the mobile device 300. For example, the processor 310 may include a digital signal processor device, a microprocessor device, and various analog to digital converters, digital to analog converters, and/or other support circuits. Control and signal processing functions of the mobile device 300 may be allocated between these devices according to their respective capabilities. The processor 310 thus may also include the functionality to encode and interleave messages and data prior to modulation and transmission. The processor 310 may additionally include an internal data modem. Further, the processor 310 may include functionality to operate one or more software programs or applications, which may be stored in the memory 320. For example, the processor 310 may be capable of operating a connectivity program, such as a web browser application 322. The web browser application 322 may then allow the mobile device 300 to transmit and receive web content, such as, for example, location-based content and/or other web page content, according to a Wireless Application Protocol (WAP), Hypertext Transfer Protocol (HTTP), and/or the like.

In some embodiments, the positioning system device 375 is configured to determine the location of the mobile device. For example, at least one of the position system devices 375 may interact with the transceiver to send and/or receive information with wireless transmitters, such as GPS or Wi-Fi. In further embodiments, the positioning system device 375 is configured to determine movement and/or orientation of the mobile device. Accelerometers, magnetometers, and other devices can be included in the mobile device to provide information to the device on the location and velocity (speed and direction) of the device. Other types of positioning system devices 375 may be included in the device without limitation. For example, altimeters can be included in the device to determine the elevation of the device. Similarly, electronic or standard compasses may be included.

The processor 310 may also be capable of operating applications, such as a wayfinding application 321. The wayfinding application 321 may be downloaded from a server and stored in the memory 320 of the mobile device 300. Alternatively, the wayfinding application 321 may be pre-installed and stored in a memory in the wayfinding chip 380 or activated directly from a website operably linked to the mobile device 300 through the network interface 360. In embodiments where the wayfinding application 321 is pre-installed or run from a website, the user may not download the wayfinding application 321 from a server.

The wayfinding chip 380 may include the necessary circuitry to provide the wayfinding functionality to the mobile device 300. Generally, the wayfinding chip 380 will include wayfinding data storage 371, i.e., a database, which may include data associated with products in a facility, such as location, facility maps, and/or planogram data. The wayfinding chip 380 and/or wayfinding data storage 371 may be an integrated circuit, a microprocessor, a system-on-a-chip, a microcontroller, or the like. As discussed above, in one embodiment, the wayfinding chip 380 provides the wayfinding functionality to the mobile device 300.

Of note, while FIG. 3 illustrates the wayfinding chip 380 as a separate and distinct element within the mobile device 300, it will be apparent to those skilled in the art that the wayfinding chip 380 functionality may be incorporated within other elements in the mobile device 300. For instance, the functionality of the wayfinding chip 380 may be incorporated within the mobile device memory 320 and/or the processor 310. In a particular embodiment, the functionality of the wayfinding chip 380 is incorporated in an element within the mobile device 300 that provides wayfinding capabilities to the mobile device 300. Moreover, the functionality may be part of the firmware of the mobile device 300. In some embodiments, the functionality is part of an application downloaded and installed on the mobile device 300. Still further, the wayfinding chip 380 functionality may be included in a removable storage device such as an SD card or the like.

The processor 310 may be configured to use the network interface 360 to communicate with one or more other devices on a network. In this regard, the network interface 360 may include an antenna 376 operatively coupled to a transmitter 374 and a receiver 372 (together a "transceiver"). The processor 310 may be configured to provide signals to and receive signals from the transmitter 374 and receiver 372, respectively. The signals may include signaling information in accordance with the air interface standard of the applicable cellular system of the wireless telephone network that may be part of the network. In this regard, the mobile device 300 may be configured to operate with one or more air interface standards, communication protocols, modulation types, and access types. By way of illustration, the mobile device 300 may be configured to operate in accordance with any of a number of first, second, third, and/or fourth-generation communication protocols and/or the like. For example, the mobile device 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 300 may also be configured to operate in accordance with non-cellular communication mechanisms, such as via a wireless local area network (WLAN) or other communication/data networks.

The network interface 360 may also include a wayfinding interface 373 in order to allow a user to execute some or all of the above-described processes with respect to the wayfinding application 321 and/or the wayfinding chip 380. The wayfinding interface 373 may have access to the hardware, e.g., the transceiver, and software previously described with respect to the network interface 360. Furthermore, the wayfinding interface 373 may have the ability to connect to and communicate with an external wayfinding data storage on a separate system within the network. In some embodiments, the wayfinding interface 373 communicates with the financial institution banking system 400 or the crowdsourcing system 270. In other embodiments, the wayfinding interface 373 communicates with the facility 220, such as by wireless communication.

As described above, the mobile device 300 may have a user interface that includes user output devices 336 and/or user input devices 340. The user output devices 336 may include a display 330 (e.g., a liquid crystal display (LCD) or the like) and a speaker 332 or other audio device, which are operatively coupled to the processor 310. In an exemplary embodiment, the user output devices 336 include stereo headphones, such as over-ear headphones or in-ear headphones that provide aural information to the user. In another embodiment, eyewear may provide output to the user. For example, eyewear may include integral scanning devices that identifies products and communicates information regarding the products to the user. The user input devices 340, which may allow the mobile device 300 to receive data from a user 210, may include any of a number of devices allowing the mobile device 300 to receive data from a user 210, such as a keypad, keyboard, touch-screen, touchpad, microphone, mouse, joystick, stylus, other pointer device, button, soft key, and/or other input device(s).

The mobile device 300 may further include a power source 315. Generally, the power source 315 is a device that supplies electrical energy to an electrical load. In one embodiment, power source 315 may convert a form of energy such as solar energy, chemical energy, mechanical energy, etc. to electrical energy. Generally, the power source 315 in the mobile device 300 may be a battery, such as a lithium battery, a nickel-metal hydride battery, or the like, that is used for powering various circuits, e.g., the transceiver circuit, and other devices that are used to operate the mobile device 300. Alternatively, the power source 315 may be a power adapter that can connect a power supply from a power outlet to the mobile device 300. In such embodiments, a power adapter may be classified as a power source "in" the mobile device.

The mobile device 300 may also include the memory 320 operatively coupled to the processor 310. As used herein, memory may include any computer readable medium configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory may additionally or alternatively include an electrically erasable programmable read-only memory (EEPROM), flash memory or the like.

The memory 320 may store any of a number of applications or programs which comprise computer-executable instructions/code executed by the processor 310 to implement the functions of the mobile device 300 described herein. For example, the memory 320 may include such applications as a wayfinding application 321, a web browser application 322, an SMS application 323, an email application 324, etc.

FIG. 4 provides a block diagram illustrating the banking system 400 in greater detail, in accordance with embodiments of the invention. As illustrated in FIG. 4, in one embodiment of the invention, the banking system 400 includes a processing device 420 operatively coupled to a network communication interface 410 and a memory device 450. In certain embodiments, the banking system 400 is operated by a first entity, such as a financial institution, while in other embodiments the banking system 400 is operated by an entity other than a financial institution.

It should be understood that the memory device 450 may include one or more databases or other data structures/repositories. The memory device 450 also includes computer-executable program code that instructs the processing device 420 to operate the network communication interface 410 to perform certain communication functions of the banking system 400 described herein. For example, in one embodiment of the banking system 400, the memory device 450 includes, but is not limited to, a network server application 470, a user account data repository 480, which includes user account information 484, a wayfinding application 321, which includes a mobile device interface 492, and other computer-executable instructions or other data. The computer-executable program code of the network server application 470 or the wayfinding application 321 may instruct the processing device 420 to perform certain logic, data-processing, and data-storing functions of the banking system 400 described herein, as well as communication functions of the banking system 400.

In some embodiments, the wayfinding application 321 is the same application as located on the mobile device. In other embodiments, some functionality is present in the financial institution banking system 400 and some functionality is present in the mobile device. As should be understood, the software and hardware providing the wayfinding functionality can be entirely present on the mobile device, entirely present on the financial institution banking system 400, or divided in some manner between the mobile device and the banking system 400. In further embodiments, the crowdsourcing system also contributes to the wayfinding functionality by augmenting data and/or processing power of the wayfinding application(s) 321.

In further embodiments, the mobile device interface 492 facilitates communication between the mobile device and the banking system. For example, the mobile device interface 492 may establish a connection with the mobile device, may encrypt or decrypt communications with the mobile device, or may provide a portal for the user to interact with the wayfinding application 321 on the banking system 400 through the mobile device.

As used herein, a "communication interface" generally includes a modem, server, transceiver, and/or other device for communicating with other devices on a network, and/or a user interface for communicating with one or more users. Referring again to FIG. 4, the network communication interface 410 is a communication interface having one or more communication devices configured to communicate with one or more other devices on the network 250, such as the mobile device 204, the facility 220, the banking system 400, and the crowd sourcing systems 270. The processing device 420 is configured to use the network communication interface 410 to transmit and/or receive data and/or commands to and/or from the other devices connected to the network 250.

FIGS. 5A and 5B provide a modified flow chart showing actions taken by the user, the wayfinding application, and the mobile device in a computer-implemented method 500 to provide directional wayfinding for a user to a product in a facility, in accordance with an embodiment of the invention. While the steps are depicted as performed by one of the parties listed in the flow chart, the steps do not need to be performed by that exact party. For example, the user is depicted as initiating the wayfinding application on the mobile device in block 504; however, the wayfinding application may do this instead of or in addition to the user. For example, the wayfinding application may determine the user's presence in a facility and automatically initiate the wayfinding application when the user enters the business.

In block 502, the computer-implemented method 500 receives at least one product in a wayfinding system. In an embodiment, the user uploads a list, such as a shopping list or wish list, to the wayfinding system. The user may provide the at least one product to the wayfinding system by manually entering the product into a software application. In other embodiments, the user emails a list comprising at least one product to the wayfinding system. In still further embodiments, the computer-implemented method 500 receives the product from a third party, such as a family member, a manufacturer, a financial institution, or a business to provide products to the wayfinding system. For example, a user's spouse may wish to update a shopping list for the user by emailing the user a product that should be picked up at the store. When the user reaches the store, the computer-implemented method 500 directs the user to the specific product requested by the user's spouse. If the user authorizes a manufacturer, financial institution, or business to provide products to the wayfinding the system, the user may be directed to those products when reaching a business. In a further embodiment, the manufacturer, financial institution, or business may provide offers to the user, such as coupons, discounts, or rewards points in return for directing the user to the product. The user may provide the at least one product to the wayfinding system in a variety of ways, and the aforementioned list is not intended to be limiting. For example, the user can provide items to the wayfinding system by taking a picture of a product, bar code, or advertisement and then being directed to the associated product in the business.

In some embodiments, the user also provides a business, a price, or a distance associated with the product. For example, the user may desire to purchase product A at business A. Similarly, the user may wish to purchase product A if it costs less than $X dollars or if product A can be found at a store within X miles of the user. It should be understood that many different limitations can be placed on products that the user is directed to using the system and method. For example, the user may specify that the computer-implemented method 500 should not direct the user to a product A unless product B, C, and D are also available. The user may wish to prepare a recipe but only if all ingredients are available.

In block 504, the user initiates the wayfinding application on the mobile device. In an embodiment, the user activates an application on the mobile device that then proceeds to determine the user's location, determine the location of the products, determines a route from the user to the product, and provide instructions to the user along the route. In other embodiments, however, the user initiates the wayfinding application by authorizing automatic activation of the wayfinding application based on meeting predefined criteria. For example, the user may authorize the wayfinding application to automatically activate when the user enters a business or is determined to be within a predefined distance of a business. A GPS unit associated with the mobile device may track the user's location and determine that the user is in proximity to a business having products provided by the user to the wayfinding system. In this manner, the user is able to add products to the wayfinding system without knowing which businesses have the products. When the user is entering the business or even merely passing by the business, the user can be alerted to the presence of the product and directed to the product's location in the business. In a still further embodiment, the user can authorize the business to activate the wayfinding application on the mobile device, such as wireless activation upon entering the business. The business may also transmit the most recent planogram, sales information, facility maps, or offers to the user when activating the application on the mobile device.

In block 506, the computer-implemented method 500 determines the location of the user. In an embodiment, the computer-implemented method 500 determines the location of the user based on triangulation. For example, a communication device associated with the mobile device may connect to at least one transmitter of a wireless signal. The processor determines the distance from the transmitter and triangulates the location of the user in the business. Any type of wireless signal that can be received in a facility may be used. In an exemplary embodiment, Wi-Fi signals are used to determine the location of the user. For example, the strength of the Wi-Fi signal may be used to determine the distance from the Wi-Fi transmitter. Alternatively, communication time between the Wi-Fi transmitter and the mobile device may also be calculated. When distance from at least three known locations is provided, algorithms to determine the location of a user are known.

In a further embodiment, the computer-implemented method 500 determines the location of the user based on proximity to pre-set markers. In some embodiments, pre-set markers are established throughout the business. For example, markers may be established at the front and end of every aisle. Markers may be placed regularly throughout the store, such as at set distances along each aisle (e.g., every five feet down an aisle) so that the user is usually or always in proximity to a marker. In some embodiments, the pre-set markers are established in a regular pattern, such as a grid. In other embodiments, however, the pre-set markers are established in a non-regular pattern. The pre-set markers may be randomly placed throughout the business or placed in key locations, such as at the front of the bakery or at a cash register. Using pre-set markers, the mobile device is configured to determine the user's location based on the pre-set marker. The mobile device may identify the nearest pre-set marker or a plurality of pre-set markers to identify the user's location. The pre-set markers may emit a signal, such as from an RFID tag, an NFC-enabled chip, or other signal that can be detected by the mobile device.

In some embodiments, the computer-implemented method 500 determines the location of the user based on the user's original location and velocity data associated with the user and/or the mobile device. For example, the computer-implemented method 500 may track the user using GPS while the user is outside the business and receiving satellite signals. When the user enters the business, the computer-implemented method 500 evaluates the current location of the user (e.g., the entry point) and tracks the user's velocity (speed and direction) to continually determine the user's location. In some embodiments, a sensor, such as an RFID or NFC sensor, detects the user's passage and thereby determines the user's initial location. The user may contact the sensor with the mobile device or the user may merely pass by the sensor and be identified. In an embodiment, a curtain or arch defines an opening to a business and senses all individuals that pass through the curtain. The sensor communicates with the user's mobile device and thereby determines the user's initial location. When the user's initial location is known, an accelerometer, magnetometer, or other device can be used to determine the user's velocity, i.e., speed and direction. By knowing the user's initial location and tracking the user's velocity based on the mobile device, the computer-implemented method 500 can accurately determine the user's current location.

In yet further embodiments, the computer-implemented method 500 determines the location of the user based on video tracking of the user by the business. In some embodiments, the business operates video cameras having tagging or user matching software. The business tracks users via the video camera and, in some embodiments, transmits the location information to the user. In an embodiment, individuals opt-in to tracking and, when the individual enters the business, the video camera identifies the individual and tracks the individual through the video camera. The video camera can identify the individual in a variety of ways, such as using facial recognition or detecting a signal produced by the mobile device. It should be understood that any or all of these methods of determining the location of the individual may be combined with one another. For example, individuals can be initially identified in a video camera based on proximity to pre-set markers.

Turning to block 508, the application receives information on the location of the product from a business. In one embodiment, the computer-implemented method 500 receives planogram data from the business providing the product. For example, the computer-implemented method may receive information on where every product the business offers is available in each aisle and shelf. Businesses often develop and update planograms for organizing display of products in businesses. The planogram information may also include the facility map, such as the length, width, and location of aisles, rows, temporary displays, and points-of-interest (e.g., customer service, cash register, emergency exits, restrooms, cash machines, etc.). In another embodiment, the computer-implemented method receives location data for the product from the vendor or manufacturer of the product. For example, a vendor delivering products to a business may record the location of the products in the business. In some instances, vendors set up displays in businesses and are capable of recording the location of the product.

In block 510, the application receives information on the location of the product from crowdsourcing. In some situations, the business may move products without updating the planogram, or the business may be out of a specific product. In these situations, the information received from the business may not be accurate. To assist the computer-implemented method in providing the most accurate information to the user, crowdsourcing data can be used to augment or replace the business information. Crowdsourcing data are data received from the public, such as from individuals shopping in the business, social networking sites and media, or other public sources of information. In some embodiments, individuals scan or input products to "tag" the location of the product in the facility. If a product is sold out, individuals can also indicate the absence of products at a location, such as the location where the planogram suggested the product would be. In some embodiments, the user scans a barcode on a product using a mobile device and then the mobile device, in coordination with location determination logic, as discussed herein, updates the computer-implemented method with the location and identity of the product. In some embodiments, object identification software, such as software that identifies products based on a video or still photograph, can be used to scan a shelf or product and identify one or more products that are present at the location of the scan.

In some embodiments, individuals are provided incentives to "tag" products. For example, individuals may receive badges, rewards, or points for tagging products. In one example, the computer-implemented method 500 varies the award based on the usefulness of the information. If many individuals desire wayfinding to a specific product, an individual may receive more points for identifying the location of that product than when an individual identifies the location of a product for which few people desire directions. In another embodiment, individuals receive incentives such as coupons, discounts, or payment to "tag" products.

In further embodiments, crowdsourcing is based on data mining. In an embodiment, an individual opts in to allow the computer-implemented method to mine the user's social networking data, mobile device data, and/or multimedia to collect information on the location of products in a facility. The computer-implemented method may evaluate images and/or posts on social networking sites, identify products in the images or posts, and determine the facility location and/or time that the product was present in the facility. In this manner, crowdsourcing can update product location information. Image and videos stored on the mobile device can also be evaluated to determine the presence of products and the location of the mobile device. In an embodiment, the camera can be set to scan all images and videos by default for products and immediately tag their location in a database to assist others in locating products. In a still further embodiment, the products are identified based on tagging in an image, or based on image and/or text identification.

In block 512, the computer-implemented method 500 determines the location of the product. In some embodiments, the computer-implemented method 500 determines the location of the product based on the business information and/or the crowdsourcing information. In an embodiment, the most recent information is used to determine the location of the product. In another embodiment, however, the information from the business and/or the crowdsourcing data is weighted based on reliability measures. For example, vendor information may be given little weight because the computer-implemented method determines that the facility moves the product after the vendor delivers the product. In an embodiment, the computer-implemented method 500 determines the location of the product based on the product itself. For example, the product may be tagged with an RFID tag, or may be emitting a wireless signal, such as a Wi-Fi signal. In some embodiments, the products are configured to emit a light or color, such as a light or color not visible to the human eye but detectable by the mobile device. Similarly, in some embodiments, the products are configured to emit a sound, such as a sound not audible to the human ear but detectable by the mobile device.

Turning to block 514, the computer-implemented method 500 determines a route from the user to the product. In an embodiment, the route is determined based on the shortest absolute distance from the user to the product. Absolute distance is based on geometry and the locations of the user and the product. The direct-line distance between the user's current location and the location of each of the products is calculated. In an embodiment, the direct-line distance may be modified, such as by the log of the distance or by squaring the absolute distance to derive a modified distance. Absolute distance may be used as a simple proxy for travel time and may also be used when routing information such as aisles or rows in the facility is not immediately available.

Distance based on the layout of the facility is a revised version of geographic distance that models the travel distance based on the likely or the shortest travel path. For example, the planogram may include a facility map that provides the layout of the rows and aisles. In another embodiment, the server determines the layout of the facility by tracking individuals that have passed through the facility previously. For example, individuals may opt in to be tracked and thereby provide layout information for facilities. As the individuals pass through the facility in their daily life, the server tracks their movement and determines the layout of the facility. To determine the route based on the layout, the server determines the distance traveled by the user to reach each of the products using the rows and aisles. In an embodiment, the product with the shortest travel distance is selected first. It should be understood that modes of transportation other than walking may be considered. For example, individuals using wheelchairs or motorized transport may also be evaluated. In this situation, wider aisles and rows may be given preference over narrower aisles.

In a still further embodiment, the route is determined based on the ease of transport along the route. The ease of travel may be estimated based on the mode of travel and congestion in the routes. For example, product A may be within a shorter walking distance than product B but congestion in the aisle to reach product A may make it faster to initially walk to product B. Congestion within businesses may be evaluated based on information received from the business and/or from the crowdsourcing data. In some embodiments, congestion is based on the layout of the facility. For example, dead ends, bottlenecks, or narrow, winding aisles may increase congestion.

In some embodiments, the computer-implemented method 500 determines the route based on the products received by the application. In an embodiment, the route is determined so that the user conveniently receives the items in a specific order. For example, the user may be directed to dry goods first, refrigerated goods second, and frozen goods third. In another example, the user is directed to products based on the size or difficulty in transporting the products. The user may be directed to small, easily transportable products before being directed to large, bulky, or difficult to transport products. It should be understood that other characteristics of the products can be evaluated while determining the route. For example, the user can be directed to the most expensive items before being directed to the least expensive items.

In another embodiment, the computer-implemented method 500 provides the route based on historic patterns of movement for the user or other individuals. Users of the computer-implemented method may have their travel through the business tracked and the routing functionality modified according to the speed with which the users pass through various portions of the business. The time of day or day of week when the user and/or the previous users traversed the route or portions of the route can also be considered. For example, some routes may be easy to travel during a weekday but very crowded on weekends. The method may direct the individual away from the congested routes on the weekend. In some embodiments, users opt-in to allowing tracking of their movements. In this way, users assist others in improving the wayfinding functionality of the computer-implemented method.

In a still further embodiment, the computer-implemented method 500 provides the route based on a goal of the user. In one embodiment, the user may desire to increase healthy behaviors and therefore instruct the computer-implemented method 500 to determine routes that encourage healthy behavior. For example, the computer-implemented method 500 may direct the user on a route that utilizes stairs rather than an elevator so that the user gets exercise walking up and down the stairs. The method may determine the route through the business so that the user walks a minimum distance on the route. In one embodiment, the computer-implemented method determines multiple routes and allows the user to choose between high impact, low impact, and shortest route. Other metrics that contribute to healthy behaviors may also be considered. For example, the route may be determined so that the user passes through the produce aisle or does not pass through the candy aisle. Selecting a route that emphasizes healthy behaviors may also influence the types of offers that the user receives along the route. It should be understood that healthy behaviors is not the only type of goal that users can establish when influencing a route determination. Users may desire to save money and be directed to generic equivalents of products on their list instead of the brand name products. Users may be directed to sale products or provided discounts for comparable products to those on their list. Users may also set a goal of shopping locally so that users are directed to products that are produced locally. Further, users may provide a goal of ease of transportation. In this example, users are directed along routes that use available elevators and avoid stairs and/or escalators.

It should also be understood that distance or time is not the only manner in which a route may be determined. The computer-implemented method may use any type of predictive analysis such as regression models (e.g., linear regression, multivariate regression, logistic regression, etc.), classification and regression trees, Bayesian analysis, data mining tools, time series models, etc. to determine a route for the user. For example, a regression model can be used to determine the likelihood that a user will accept offers available to be presented to the user. The most likely offers can be identified and the route can be determined based on both the product provided by the user and the offers that are likely to be accepted.

In block 516, the mobile device provides instructions to the user along the route. In an exemplary embodiment, the instructions are audible instructions. For example, the mobile device may provide audible instructions using natural language, such as "proceed ten paces forward and then turn left." In an embodiment, the instructions are customized for the user, such as based on method of transportation (e.g., walking, using a wheelchair, etc.) or based on pace/speed of the user. In another embodiment, the instructions are provided to the user through stereo headphones, such as over-ear or in-ear headphones. The stereo headphones allow the user to receive both instructions regarding the location of the product as well as an indication of the direction, and in some cases, distance to the next turn on the route. For example, a user may receive a notification, e.g., a tone, through the stereo headphones, wherein the tone has a magnitude and an apparent directionality. The user orients himself or herself using the tone and proceeds along the route directed by the tone. In one embodiment, the headphones provide binaural sound that creates a three dimensional environment including distance and direction to the product. The binaural sound may take into account the natural ear spacing of the user's head and ears. As the user orients and travels through the business, the binaural sound provides a three dimensional sound image of the surroundings and of the location of the product.

In further embodiments, the instructions are visual instructions. For example, written directions can be provided. The written directions can be provided on the screen of the mobile device. In other embodiments, a map is provided, such as an electronic map on the screen of the mobile device. The map can show the user's current location, the location of the products, the route, and/or the layout of the business. In other embodiments, a compass heading is provided to orient the user along the route, such as an arrow pointing in the direction of travel. In a still further embodiment, the visual instructions are projected into the air or projected onto the floor.

In an embodiment, the instructions are physical instructions. For example, vibrations in the mobile device can be used to orient the user along the route. In one embodiment, the mobile device vibrates when the user is proceeding along the route. In another embodiment, the mobile device vibrates when the user deviates from the route. It should be understood that any or all of these methods of providing instructions to user can be combined to direct the user along the route. For example, audible instructions can be provided to the user through stereo headphones to direct the user along the route; if the user deviates from the route, the mobile device can vibrate to alert the user to this fact and allow the user to re-orient along the route.

In some embodiments, the user follows the route to the product, as shown in block 518. The user may proceed along the route and continue shopping for products as they travel. In block 520, the mobile device tracks the location of the user along the route. In one embodiment, the mobile device determines the user's speed and pace along the route. Once the user's speed and/or pace is known, instructions can be modified to take into account the user's mobility. If a user is moving particularly quickly, the route can be adjusted or the instructions provided to the user can be altered to more accurately describe the route.

In another embodiment, the mobile device detects a deviation from the route and adjusts the route and/or offers based on the deviation. The mobile device tracks the user as the user proceeds along the route. The mobile device detects the deviation and evaluates the current location of the user when the user deviates from the route. The current location of the user can be used to determine a predicted plan for the user. For example, the plan may be predicted based on the products that the user is visiting. In one embodiment, the length of time the user spends in a specific section is used to determine the predicted plan. For example, if the user halts in front of a specific display for sunscreen and beach towels, the computer-implemented method may predict that the user is planning on going to the beach. If the user merely walks past the sunscreen and beach towel display in a deviation of the route, the computer-implemented method will not predict that the user is planning on going to the beach. The computer-implemented method can determine the products in the user's current location based on the planogram and crowdsourcing information. For example, the mobile device may evaluate the deviation and determine that the user has deviated from the route to enter the section of the facility where charcoal, lighter fluid, and paper plates are present. The computer-implemented method may determine that the user is planning a barbecue and modify the route accordingly. The computer-implemented method may direct the user on a route that takes the user near hamburger and hotdog buns. Alternatively or additionally, the computer-implemented method may provide offers directed to products associated with the predicted plan.

In block 522, the computer-implemented method 500 updates the route based on the current location of the user. If the user deviates from the route, the computer-implemented method can update the route based on the user's current location. The method may also switch how the location of the user and/or the product is determined as the user proceeds along the route.

In block 524, the computer-implemented method 500 provides offers along the route. As the user is proceeding along the route, offers related to products passed on the route may be made to the user. In this manner, the user is provided an offer for a product in proximity to the user while the user is already shopping. The computer-implemented method may utilize demographic, financial transaction, social networking, or other data to target offers to the user. In an embodiment, the business provides targeted offers to the user based on the user's purchasing history at the business. In still further embodiments, the method and/or business provides offers to the user based at least in part on the products provided by the user. For example, the offer can be for a product related to the products already present on the list provided by the user.

The computer-implemented method 500 may provide the offer to the user in a variety of ways. In an embodiment, the method provides the offer to the user by contacting the user through the user's mobile device. For example, the user may receive an audible message when passing the product associated with the method. In some embodiments, the computer-implemented method provides a text message (e.g., a short message service, SMS, or a multimedia messaging service, MMS, etc.) on the user's mobile device alerting them to the offer. In another embodiment, the server provides a pre-recorded, automated, or live phone call to the user providing the offer. In a still further embodiment, the server provides an email, an instant message, a contact via a social networking site, or other contact means to provide the offer to the user. In some embodiments, the offer is not made while the user is passing the product in the business. Instead, the offer may be made when the user is entering, leaving, or viewing competitor products in the business. The user may also be directed to the products associated with the offer through the computer-implemented method, as discussed herein.

Turning now to block 526, the user reaches a product on the route. If multiple products are provided to the wayfinding system, the product may be just one of many along the route. In an embodiment, the computer-implemented method 500 provides an indication that the product has been reached. For example, the computer-implemented method may provide a customary tone or beep to indicate that the user is next to or close to the product. For example, the user may be positioned next to a specific type of product. However, reaching the product on the route may not mean that the user can necessarily reach out and grab the product. For example, the user may be directed to the bakery counter if the user includes a loaf of bread on the list. Similarly, the user may be directed to the entrance to the rest rooms if the user includes a restroom on the list.

When the user reaches the product, the computer-implemented method 500 may further assist the user in identifying the product. For example, the computer-implemented method can instruct the user which shelf the product is located, the shape of the product, or other identifying information to assist the user in selected the proper product. In some embodiments, the computer-implemented method also provides audible assistance to the user in identifying products, as will be discussed in block 528 and 530.

In block 528, in some embodiments the user scans the product with the mobile device. The mobile device may include a scanning device, such as a still camera, video camera, or barcode scanner. In an embodiment, once the user reaches the product, the user selects the product and scans it with the scanning device. In some embodiments, the user picks the product up and scans it directly. The entire product can be scanned or a barcode, UPC code, or tag on the product can be scanned. In other embodiments, however, the user scans the shelf or region where the product is located. When scanning the general area, the computer-implemented method can identify multiple products in the scanning region and provide additional information to the user to locate the desired product. Scanning a general area may also update the crowdsourcing data.

In further embodiments, the computer-implemented method and system includes eyewear, such as goggles or glasses, that provides identification functionality. For example, in an embodiment, glasses are provided with or modified to include a video or still camera. The video or still camera can be mounted on the glasses and is configured to allow the user to point the camera by turning and lifting the head. Images received from the camera are processed by the computer-implemented method and an audio notification of the product can be provided to the user. In a further embodiment, a second camera is provided that is configured to collect data on where the user's hand is pointing. For example, the user can point at items on a shelf and receive information on what is being pointed at. As the user moves his or her hand to the side, various items pointed at are communicated to the user until the item the user is interested in is identified. At this point, the user is able to reach out and grab the item. In some embodiments, the computer-implemented method notifies the user of the product information through communication with the mobile device. In another embodiment, however, the eyewear includes integral speakers that provide audio to the user. In some embodiments, the eyewear provides not only identification information, but also other relevant details, such as nutrition facts, product reviews, or price comparisons.

In block 530, the computer-implemented method 500 identifies and/or confirms the product. As discussed, the computer-implemented method may include product identification functionality, such as image identification software. For example, the computer-implemented method can recognize the type of product, brand, and other details relating to the product once the user scans the product. If a user includes a can of black beans on a shopping list, the user may be directed to the location where the beans are present in the aisle. A visually-impaired user may not be able to distinguish between black beans and pinto beans in a can. The computer-implemented method, however, can scan the can the user is holding, determine the contents, and then provide confirmation to the user that the correct can has been selected. For example, the computer-implemented method may read aloud the brand and contents of the can after scanning. The method may confirm, such as via a tone, that the desired product is selected and scanned. Alternative products may also be identified for the user. For example, substitute products may be identified if the product that the user is searching for is unavailable at the location. For instance, a generic equivalent may be suggested to the user if the brand name product the user is searching for is unavailable. Additionally, synonyms may be evaluated and provided to the user as an alternative. For example, if the user includes chick peas on their list the computer-implemented method may also direct the user to garbanzo beans, a synonym for chick peas. Other methods of identifying products, such as by scanning bar codes or tags are possible for identifying and/or confirming the product.

In FIG. 6, an example of a method of providing directional wayfinding to a user is provided, in accordance with an embodiment of the invention. In this example, the user 210 activates the directional wayfinding application 321 on the user's mobile device 610. The directional wayfinding application 321 is displayed on the screen 620 and provides a dynamic map including an icon 642 depicting the user's current location, a line 644 depicting the route, and at least one icon depicting the product or products 646. As the user 210 proceeds along the route, the screen 620 updates to display the current location of the icon 642 depicting the user and the progression along the route. In some embodiments, the directional wayfinding application 321 is able to provide the layout of the business as well.

The above description refers to a centralized server as the computing device processor and describes the server as performing the computer-implemented method. It should be understood, however, that the computing device processor can be a mobile device of the user and the processor associated with the mobile device can perform the computer-implemented method. In one embodiment, the data processing associated with the computer-implemented method can be performed on the mobile device and the data can be stored on remote servers. In another embodiment, the data is stored on the mobile device. In this embodiment, the computer-implemented method is capable of operating when the user does not have access to wireless networks, such as in areas of low coverage or where buildings prevent coverage.

The flowcharts and block diagrams in the figures illustrate the architecture, functionality, and operation of possible implementations of apparatuses, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, functions repeated by the two blocks shown in succession may, in fact, be executed substantially concurrently, or the functions noted in the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer-executable instructions.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Embodiments of the present invention are described below with reference to flowchart illustrations and/or block diagrams of such methods and apparatuses. It will be understood that blocks of the flowchart illustrations and/or block diagrams, and/or combinations of blocks in the flowchart illustrations and/or block diagrams, can be implemented by computer-executable program instructions (i.e., computer-executable program code). These computer-executable program instructions may be provided to a processor of a general purpose computer, special purpose computer, or other programmable data processing apparatus to produce a particular machine, such that the instructions, which execute via the processor of the computer or other programmable data processing apparatus, create a mechanism for implementing the functions/acts specified in the flowchart and/or block diagram block or blocks. As used herein, a processor may be "configured to" perform a certain function in a variety of ways, including, for example, by having one or more general-purpose circuits perform the function by executing one or more computer-executable program instructions embodied in a computer-readable medium, and/or by having one or more application-specific circuits perform the function.

These computer-executable program instructions may be stored or embodied in a computer-readable medium to form a computer program product that can direct a computer or other programmable data processing apparatus to function in a particular manner, such that the instructions stored in the computer readable memory produce an article of manufacture including instructions which implement the function/act specified in the flowchart and/or block diagram block(s).

Any combination of one or more computer-readable media/medium may be utilized. In the context of this document, a computer-readable storage medium may be any medium that can contain or store data, such as a program for use by or in connection with an instruction execution system, apparatus, or device. The computer-readable medium may be a transitory computer-readable medium or a non-transitory computer-readable medium.

A transitory computer-readable medium may be, for example, but not limited to, a propagation signal capable of carrying or otherwise communicating data, such as computer-executable program instructions. For example, a transitory computer-readable medium may include a propagated data signal with computer-executable program instructions embodied therein, for example, in base band or as part of a carrier wave. Such a propagated signal may take any of a variety of forms, including, but not limited to, electromagnetic, optical, or any suitable combination thereof. A transitory computer-readable medium may be any computer-readable medium that can contain, store, communicate, propagate, or transport program code for use by or in connection with an instruction execution system, apparatus, or device. Program code embodied in a transitory computer-readable medium may be transmitted using any appropriate medium, including but not limited to wireless, wired, optical fiber cable, radio frequency (RF), etc.

A non-transitory computer-readable medium may be, for example, but not limited to, a tangible electronic, magnetic, optical, electromagnetic, infrared, or semiconductor storage system, apparatus, device, or any suitable combination of the foregoing. More specific examples (a non-exhaustive list) of the non-transitory computer-readable medium would include, but is not limited to, the following: an electrical device having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It will also be understood that one or more computer-executable program instructions for carrying out operations of the present invention may include object-oriented, scripted, and/or unscripted programming languages, such as, for example, Java, Perl, Smalltalk, C++, SAS, SQL, Python, Objective C, and/or the like. In some embodiments of the invention, the one or more computer-executable program instructions for carrying out operations of embodiments of the present invention are written in conventional procedural programming languages, such as the "C" programming languages and/or similar programming languages. The computer program instructions may alternatively or additionally be written in one or more multi-paradigm programming languages, such as, for example, F#.

The computer-executable program instructions may also be loaded onto a computer or other programmable data processing apparatus to cause a series of operation area steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention may take the form of an entirely hardware embodiment of the invention, an entirely software embodiment (including firmware, resident software, micro-code, etc.), or an embodiment combining software and hardware aspects that may generally be referred to herein as a "module," "application," or "system."

It should be understood that terms like "bank," "financial institution," and "institution" are used herein in their broadest sense. Institutions, organizations, or even individuals that process financial transactions are widely varied in their organization and structure. Terms like financial institution are intended to encompass all such possibilities, including but not limited to banks, finance companies, stock brokerages, credit unions, savings and loans, mortgage companies, insurance companies, and/or the like. Additionally, disclosed embodiments may suggest or illustrate the use of agencies or contractors external to the financial institution to perform some of the calculations, data delivery services, and/or authentication services. These illustrations are examples only, and an institution or business can implement the entire invention on their own computer systems or even a single work station if appropriate databases are present and can be accessed.

The terminology used herein is for the purpose of describing particular embodiments only and is not intended to be limiting of the invention unless the context clearly indicates otherwise. As used herein, the singular forms "a," "an," and "the" are intended to include the plural forms as well, unless the context clearly indicates otherwise. It will be further understood that the terms "includes," "has," "comprises," "including," having," and/or "comprising," when used in this specification, specify the presence of stated features, integers, steps, operations, elements, and/or components in the stated embodiment of the invention, but do not preclude the presence or addition of one or more other features, integers, steps, operations, elements, components, and/or groups thereof.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for directing a user to locations of two or more products in a facility using product location data provided from a plurality of individuals via their associated mobile devices, wherein locations of a plurality of products in the facility is input by the plurality of individuals into one or more data sources, wherein the facility is a physical facility, the method comprising the following operations performed by one or more computing devices:

identifying the plurality of products offered at the facility from one or more sources associated with the plurality of individuals, wherein the one or more sources include social media feeds that are accessed by the plurality of individuals while the plurality of individuals are at a location of at least one product of the plurality of products in the facility;

receiving, from multiple data feeds over a distributed network from the one or more sources associated with the plurality of individuals, location information associated with the plurality of products in the facility;

augmenting, a planogram of the facility with the location information associated with the plurality of products, wherein the planogram further comprises a facility map that provides a layout of the facility;

providing an installable application to a mobile device of the user for directing the user to the two or more products in the facility, wherein the installable application displays the planogram to the user based on augmenting the location information of the two or more products on the planogram of the facility;

receiving, via the installable application installed on the mobile device of the user, a request from the user for directions to the two or more products in the facility, wherein receiving the request further comprises:

receiving, from the user via installable the application installed on the mobile device, at least one primary product that the user wishes to be directed to; and receiving, at the installable application installed on the mobile device, an email request to direct the user to at least one secondary product, from a secondary user device of a secondary user associated with the user;

wherein, the two or more products that the user is directed to in the facility comprise the at least one primary product received from the user, and the at least one secondary product received from the second user;

determining a location of the user based on a first positioning system and a second positioning system, wherein the first positioning system is employed when the user is located outside the facility and the second positioning system is employed when the user is located inside the facility, wherein the first positioning system comprises identifying the location of the user based on communicating with a Global Positioning System (GPS) device associated with the user and wherein the second positioning system comprises identifying the location of the user based on the mobile device of the user interacting with one or more detector devices, positioned within the facility;

determining a location of each of the two or more products in the facility based on augmenting the location information on the planogram of the facility;

determining a product characteristic for each of the two or more products, wherein the product characteristic comprises a product size and wherein determining the product characteristic further comprises ordering the two or more products in ascending order of their product sizes;

determining a route within the facility that would lead the user to the two or more products, wherein the route is determined based on the ordering of the two or more products in ascending order of their product sizes;

transmitting instructions that cause the installable application installed on the mobile device to present the route for locating the two or more products in the facility;

determining an intermediate location of the user, wherein determining comprises receiving an updated location for the user from the second positioning system, communicating with the mobile device of the user;

identifying that the user deviated from the route based on determining that the intermediate location of the user deviates from the route;

in response to determining that the intermediate location of the user deviates from the route:

identifying, one or more deviation products of the plurality of products, located at a deviated intermediate location, wherein the one or more deviation products are identified based on the location information associated with the plurality of products in the facility received from the one or more sources associated with the plurality of individuals;

determining a length of time spent by the user at the deviated intermediate location;

determining a predicted plan for the user based on the identified one or more deviation products and the length of time spent by the user at the deviated intermediate location;

determining a related product based on the predicted plan, wherein the related product is different from the one or more deviation products; and modifying the route such that the related product is located along the route;

retrieving transaction history of the user, wherein the transaction history comprises one of more purchases made by the user for the two or more products;

determining, based on the transaction history, a second product that the user previously purchased in conjunction with the two or more products;

determining that the second product is located along the route;

identifying, using the one or more computing devices, an offer for the second product;

receiving an updated location for the user from the one or more detector devices, positioned within the facility, communicating with the mobile device of the user;

determining that the user is located proximate to the second product based on receiving the updated location for the user; and transmitting instructions that cause the installable application installed on the mobile device of the user to present the offer based on determining that the user is located proximate to the second product.

2. The computer-implemented method of claim 1, wherein presenting the route comprises instructing the mobile device to communicate audible instructions.

3. The computer-implemented method of claim 2, wherein the audible instructions are provided to the user in stereo.

4. The computer-implemented method of claim 1, wherein the location of the user is determined by:

identifying an initial location of the user; and tracking movement of the mobile device associated with the user from the initial location of the user.

5. The computer-implemented method of claim 1, wherein the planogram of the facility further comprises a layout of rows and aisles in the facility.

6. The computer-implemented method of claim 5, wherein the planogram of the facility further comprises congestion data in paths of the facility.

7. The method of claim 1, wherein the route is determined to direct the user past the second product before reaching the two or more products.

8. The computer-implemented method of claim 1, wherein the method further comprises:

receiving a request from the user for directions to the two or more products;

determining that the user is located within a predetermined distance from the facility, based on the first positioning system;

determining that the facility includes the two or more products based on analyzing the plurality of products in the facility received from the plurality of individuals;

transmitting, automatically, instructions to the mobile device that activate the installable application installed on the mobile device to direct the user to the two or more products, based on determining that the facility includes the two or more products.

9. The computer-implemented method of claim 1, wherein determining the route within the facility further comprises adding a facility-oriented location to the route, wherein the facility-oriented location comprises a cash register.

10. The computer-implemented method of claim 1, wherein determining the route within the facility further comprises determining the route based on one or more health preferences received from the user, wherein the route is determined such that the route includes stairs and/or the route does not include a predetermined type of food products.

11. A system for directing a user to locations of two or more products in a facility using product location data provided from a plurality of individuals via their associated mobile devices, wherein locations of a plurality of products in the facility is input by the plurality of individuals into one or more data sources, wherein the facility is a physical facility, the system comprising:

a computing platform including a processor and a memory;

a crowd sourcing routine stored in the memory, executable by the processor, and configured to identify the plurality of products offered at the facility from one or more sources associated with the plurality of individuals, wherein the one or more sources include social media feeds that are accessed by the plurality of individuals while the plurality of individuals are at a location of at least one product of the plurality of products in the facility;

a data pulling routine stored in the memory, executable by the processor, and configured to receive, from multiple data feeds over a distributed network from the one or more sources associated with the plurality of individuals, location information associated with products in the facility;

a planogram generation routine stored in the memory, executable by the processor, and configured to augment a planogram of the facility with the location information associated with the plurality of products, wherein the planogram further comprises a facility map that provides a layout of the facility;

an application installation routine stored in the memory, executable by the processor, and configured to provide an installable application to a mobile device of the user for directing the user to the two or more products in the facility, wherein the installable application displays the planogram to the user based on overlaying the location information of the two or more products on the planogram of the facility;

a communication routine stored in the memory, executable by the processor, and configured to receive, via the installable application installed on the mobile device of the user, a request from the user for directions to the two or more products in the facility, wherein receiving the request further comprises:
- receiving, from the user via the installable application installed on the mobile device, at least one primary product that the user wishes to be directed to; and
- receiving, at the installable application installed on the mobile device, an email request to direct the user to at least one secondary product, from a secondary user device of a secondary user associated with the user;
- wherein, the two or more products that the user is directed to in the facility comprise the at least one primary product received from the user, and the at least one secondary product received from the second user;

a user location routine stored in the memory, executable by the processor, and configured to determine a location of the user based on a first positioning system and a second positioning system, wherein the first positioning system is employed when the user is located outside the facility and the second positioning system is employed when the user is located inside the facility, wherein the first positioning system comprises identifying the location of the user based on communicating with a Global Positioning System (GPS) device associated with the user and wherein the second positioning system comprises identifying the location of the user based on the mobile device of the user interacting with one or more detector devices, positioned within the facility;

a product location routine stored in the memory, executable by the processor, and configured to determine a location of the two or more products in the facility based on augmenting the location information on the planogram of the facility;

a product characteristic determination routine, executable by the processor, and configured to determine a product characteristic for each of the two or more products, wherein the product characteristic comprises a product size and wherein determining the product characteristic further comprises ordering the two or more products in ascending order of their product sizes;

a route determination routine stored in the memory, executable by the processor, and configured to determine a route from the location of the user to the location of the two or more products, wherein the route is determined based on ordering of the two or more products in ascending order of their product sizes;

a presentation routine stored in the memory, executable by the processor and configured to transmit instructions that cause the installable application installed on the mobile device to present the route for locating the two or more products in the facility;

a user location monitoring routine stored in the memory, executable by the processor, and configured to determine an intermediate location of the user, wherein determining comprises receiving an updated location for the user from the second positioning system, communicating with the mobile device of the user;

the route determination routine stored in memory, executable by the processor and configured to identify that the user deviated from the route based on determining that the intermediate location of the user deviates from the route;

in response to determining that the intermediate location of the user deviates from the route, the route determination routine being configured to:
- identify, one or more deviation products of the plurality of products, located at a deviated intermediate location, wherein the one or more deviation products are identified based on the location information associated with the plurality of products in the facility received from the one or more sources associated with the plurality of individuals;
- determine a length of time spent by the user at the deviated intermediate location;
- determine a predicted plan for the user based on the identified one or more deviation products and the length of time spent by the user at the deviated intermediate location;
- determine a related product based on the predicted plan, wherein the related product is different from the one or more deviation products; and
- modify the route such that the related product is located along the route;

a financial information routine stored in the memory, executable by the processor, and configured to retrieve transaction history of the user, wherein the transaction history comprises one of more purchases made by the user for the two or more products;

a product determination routine stored in the memory, executable by the processor and configured to determine, based on the transaction history, a second product that the user previously purchased in conjunction with the two or more products;

an offer location routine, stored in the memory, executable by the processor, and configured to determine that that the second product is located along the route;

an offer routine stored in the memory, executable by the processor, and configured to identify an offer for the second product;

a routine stored in the memory, executable by the processor, and configured to receive an updated location for the user from the one or more detector devices, positioned within the facility, communicating with the mobile device of the user;

a routine stored in the memory, executable by the processor, and configured to determine that the user is located proximate to the second product based on receiving the updated location for the user; and an offer presentation routine stored in the memory, executable by the processor, and configured to transmit instructions that cause the installable application installed on the mobile device of the user to present the offer based on determining that the user is located proximate to the second product.

12. The system of claim 11, further comprising stereo headphones, wherein the stereo headphones are configured to present the route to the user.

13. The system of claim 11, further comprising a product identification routine stored in the memory, executable by the processor and configured to identify the two or more products.

14. The system of claim 13, further comprising a scanning device, wherein the scanning device is selected from a group consisting of a video camera, a still camera, and a bar code scanner.

15. The system of claim 14, wherein the scanning device is configured to identify a product based on a scan of the product.

16. A computer program product for directing a user to locations of two or more products in a facility using product location data provided from a plurality of individuals via their associated mobile devices, wherein the locations of a plurality of products in the facility is input by the plurality of individuals into one or more data sources, wherein the facility is a physical facility, the computer program product comprising:
- a non-transitory computer-readable storage medium having computer-executable instructions comprising:
- a set of codes for causing the computer to identify the plurality of products offered at the facility from one or more sources associated with the plurality of individuals, wherein the one or more sources include social media feeds that are accessed by the plurality of individuals while the plurality of individuals are at a location of at least one product of the plurality of products in the facility;
- a set of codes for causing the computer to receive, from multiple data feeds over a distributed network from the one or more sources associated with the plurality of individuals, location information associated with the plurality of products in the facility;
- a set of codes for causing the computer to augment a planogram of the facility with the location information associated with the plurality of products, wherein the planogram further comprises a facility map that provides a layout of the facility;
- a set of codes for causing the computer to providing an installable application to a mobile device of the user for directing the user to the two or more products in the facility, wherein the installable application displays the planogram to the user based on augmenting the location information of the two or more products on the planogram of the facility;
- a set of codes for causing a computer to receive, via the installable application installed on the mobile device of the user, a request from the user for directions to the two or more products in facility, wherein receiving the request further comprises:
  - receiving, from the user via the installable application installed on the mobile device, at least one primary product that the user wishes to be directed to; and
  - receiving, at the installable application installed on the mobile device, an email request to direct the user to at least one secondary product, from a secondary user device of a secondary user associated with the user;
  - wherein, the two or more products that the user is directed to in the facility comprise the at least one primary product received from the user, and the at least one secondary product received from the second user;
- a set of codes for causing the computer to determine a location of the user based on a first positioning system and a second positioning system, wherein the first positioning system is employed when the user is located outside the facility and the second positioning system is employed when the user is located inside the facility, wherein the first positioning system comprises identifying the location of the user based on communicating with a Global Positioning System (GPS) device associated with the user and wherein the second positioning system comprises identifying the location of the user based on the mobile device of the user interacting with one or more detector devices, positioned within the facility;
- a set of codes for causing the computer to determine a location of the two or more products in the facility based on augmenting the location information on the planogram of the facility;
- a set of codes for causing the computer to determine a product characteristic for each of the two or more products, wherein the product characteristic comprises a product size and wherein determining the product characteristic further comprises ordering the two or more products in ascending order of their product sizes;
- a set of codes for causing a computer to determine a route from the user to the two or more products, wherein the route is determined based on ordering of the two or more products in ascending order of their product sizes;
- a set of codes for causing the computer to instruct the installable application installed on the mobile device to present the route for locating the two or more products in the facility;
- a set of codes for causing the computer to determine an intermediate location of the user, wherein determining comprises receiving an updated location for the user from the second positioning system, communicating with the mobile device of the user;
- a set of codes for causing the computer to identify that the user deviated from the route based on determining that the intermediate location of the user deviates from the route;
- in response to determining that the intermediate location of the user deviates from the route, a set of codes for causing the computer to:
  - identify, one or more deviation products of the plurality of products, located at a deviated intermediate location, wherein the one or more deviation products are identified based on the location information associated with the plurality of products in the facility received from the one or more sources associated with the plurality of individuals;
  - determine a length of time spent by the user at the deviated intermediate location;
  - determine a predicted plan for the user based on the identified one or more deviation products and the length of time spent by the user at the deviated intermediate location;
  - determine a related product based on the predicted plan, wherein the related product is different from the one or more deviation products; and
  - modify the route such that the related product is located along the route;
- a set of codes for causing the computer to retrieve transaction history of the user, wherein the transaction history comprises one of more purchases made by the user for the two or more products;
- a set of code for causing the computer to determine, based on the transaction history, a second product that the user previously purchased in conjunction with the two or more products;

a set of codes for causing the computer to determine that the second product is located along the route;

a set of codes for causing the computer to determine an offer for the second product;

a set of codes for causing the computer to receive an updated location for the user from the one or more detector devices, positioned within the facility, communicating with the mobile device of the user;

a set of codes for causing the computer to determine that the user is located proximate to the second product based on receiving the updated location for the user; and a set of codes for causing the computer to instruct the installable application installed on the mobile device of the user to present the offer based on determining that the user is located proximate to the second product.

17. The computer program product of claim 16, wherein the mobile device of the user audibly presents the route.

\* \* \* \* \*